United States Patent Office 3,448,080
Patented June 3, 1969

3,448,080
POLYIMIDES PREPARED FROM 2,6-DIAMINO-
BENZO[1,2-D:5,4'-D]BISTHIAZOLE
Stephen S. Hirsch, Raleigh, N.C., assignor to Monsanto
Company, St. Louis, Mo., a corporation of Delaware
No Drawing. Filed Jan. 9, 1967, Ser. No. 607,911
Int. Cl. C08g 20/32
U.S. Cl. 260—65                                       7 Claims

ABSTRACT OF THE DISCLOSURE

High molecular weight thermally stable polyimides are prepared by reacting aromatic dianhydrides with 2,6-diaminobenzo[1,2-d:5,4-d']bisthiazole, a diamine containing only two nuclear substituted hydrogen atoms, which results in the polyimides having less than 2 percent hydrogen.

BACKGROUND OF THE INVENTION

This invention relates to low hydrogen polyimides containing less than 2 percent hydrogen by weight, and more particularly to polyimides prepared from 2,6-diaminobenzo[1,2-d:5,4-d']bisthiazole, which polyimides have a high degree of thermal stability in air.

It has become increasingly apparent that the majority of applications of high-temperature stable polymers will be under atmospheric rather than inert conditions. Accordingly, more and more effort has been expended to develop fibers and films suitable for prolonged use in air at elevated temperatures.

Polymer molecules generally undergo thermal or oxidative breakdown through some facile mode of decomposition such as "unzipping" or β-elimination. When such a mechanism is not possible, however, the thermal-oxidative stability and thus the maximum operating temperature of the polymer is determined by the weakest bond in the polymer chain. Obviously, the structural requirements needed for thermal stability, in addition to those needed for the desired physical properties, makes the synthesis of linear high temperature polymers extremely difficult.

Previous work has shown that the point of weakness in polymer chains is quite often the C—H bond. Replacement of the C—H bond by C—F bonds in aliphatic hydrocarbon polymers, such as polyethylene, has led to some improvement in thermal stability. Polymers of this type, for example polytetrafluoroethylene, are generally stable only up to temperatures somewhat over 200° C.

More recent work by Marvel, Wall and others in this field (C. S. Marvel, Preprints of Regional Technical Conference, Society of Plastics Engineers entitled Stability of Plastics—Washington, D.C. June 4, 1964), has revealed that thermal stability is improved, if the polymer chain consists chiefly of ring moieties high in aromaticity and desirably with one or more hetero atoms in at least some if not all of the rings as in heterocyclic polymers. A typical well known example of this type of polymer is the polybenzimidazole series which exhibits outstanding properties in an inert atmosphere but which fails rapidly at relatively moderate temperatures in air.

Rather than replace all C—H bonds with C—F bonds another approach toward improving thermal resistance is to reduce the number of C—H bonds to a low level. This has been achieved by the present invention.

SUMMARY OF THE INVENTION

In general, the invention encompasses high molecular weight fiber and film-forming polyimides containing less than 2 percent hydrogen by weight and consisting essentially of the recurring structural unit

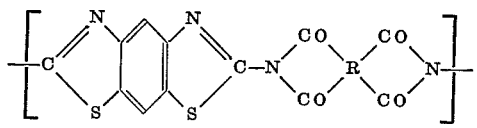

wherein R is a tetravalent benzene aromatic radical composed of at least one benzene ring, may be composed of two benzene rings and up to 13 carbon atoms, and containing not more than 6 C—H bonds. By virtue of having very few C—H bonds, which being weak undergo thermal or oxidative breakdown readily in air, these polyimides have a much higher degree of thermal stability under atmospheric conditions than conventional polyimides.

DESCRIPTION OF THE PREFERRED EMBODIMENTS

The low hydrogen polyimides of this invention may be prepared by any of the conventional and well known methods for the preparation of polyimides which involve the reaction of a diamine with a dianhydride to form a polyamide-acid intermediate which is converted to the polyimide as illustrated by the following reaction

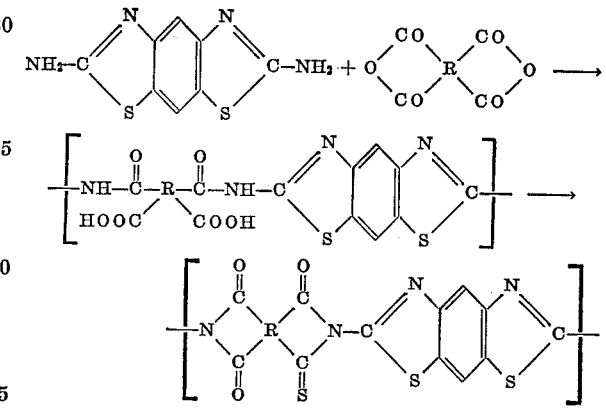

where R has the significance previously given.

As suitable reactants with 2,6-diaminobenzo[1,2-d:5,4-d']bisthiazole there may be used any benzene aromatic dianhydride which has 6 or fewer C—H bonds. Representative dianhydrides are those of the formula

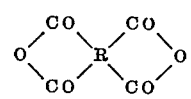

wherein R is a tetravalent benzene aromatic radical as previously defined and may be selected from

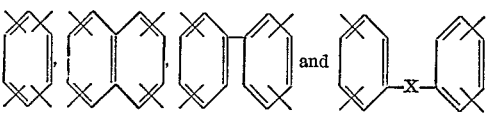

where X is CO, O, S, SO₂ or CONH.

Illustrations of such dianhydrides include pyromellitic dianhydride, which is preferred, and also the following:

1,2,5,6-naphthalene tetracarboxylic dianhydride
2,3,6,7-naphthalene tetracarboxylic dianhydride
3,3',4,4'-diphenyl tetracarboxylic dianhydride
2,2',3,3'-diphenyl tetracarboxylic dianhydride
Bis(3,4-dicarboxyphenyl)sulfone dianhydride
Bis(3,4-dicarboxyphenyl)ether dianhydride
3,4,3',3'-benzophenone tetracarboxylic dianhydride
2,3,2',3'-benzophenone tetracarboxylic dianhydride
2,3,3',4'-benzophenone tetracarboxylic dianhydride
Pyrazine-2,3,5,6-tetracarboxylic dianhydride The diamine of this invention may be prepared according to the method described by Cesari Finzi et al. in Gazz. chim. ital. 89, 2543 (1959).

The invention will be more clearly understood by referring to the examples which follow, Example I representing the best mode contemplated for practicing the invention and all parts and percents are by weight unless otherwise indicated. It is understood that the examples, although illustrating specific embodiments of the present invention, should not be considered limitative of the invention.

EXAMPLE I

Polymer from 2,6-diaminobenzol[1,2-d:5,4-d']bisthiazole (m-DBBT) and pyromellitic dianhydride (PMDA)

A 1.892 g. portion of m-DBBT (0.0085 mole) was placed in a 2 oz. screw cap bottle together with 25 ml. of N-methyl-2-pyrrolidone. PMDA (1.8574 g.; 0.0085 mole) was added and the mixture was shaken vigorously by hand. Mechanical tumbling was then continued for three days whence a viscous solution resulted. An amide-acid film was cast using a Gardner knife set at 15 mils. After the film was partially dried in a 120° C. oven, it was removed from the glass plate and subjected to a programmed heat cure up to 300° C. The polyimide film which resulted was stable at temperatures in excess of 300° C. in air.

EXAMPLE II

A film prepared from 2,6-diaminobenzo[1,2-d:5,4-d']bisthiazole and 3,4,3',4'-benzophenone tetracarboxylic dianhydride was tested and found to have similar properties.

The polyimides of this invention are useful in a wide range of applications. They may be prepared in fiber, filament, or film form for textile and related industrial uses. Other commercial utilization includes binders in composites and laminates, molded products and surface coatings either alone or in conjunction with other natural and synthetic resins, for instance in multi-ply coated wire. The intermediate films are especially useful as self-bonding wrapping tapes for electrical insulation and the like.

The foregoing detailed description has been given for clearness of understanding only, and unnecessary limitations are not to be construed therefrom. The invention is not to be limited to the exact details shown and described since obvious modifications will occur to those skilled in the art, and any departure from the description herein that conforms to the present invention is intended to be included within the scope of the claims.

I claim:

1. A low hydrogen, high molecular weight, fiber and film forming polyimide containing less than 2 percent hydrogen by weight and consisting essentially of the recurring structural unit

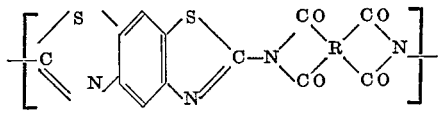

wherein R is a tetravalent aromatic radical selected from the group consisting of

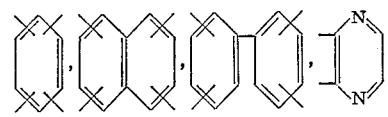

and

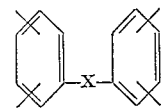

wherein $x$ is CO, O, S, SO$_2$ or CONH.

2. The polyimide of claim 1 wherein R is

3. The polyimide of claim 1 wherein R is

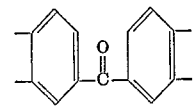

4. The polyimide of claim 1 wherein R is

5. The polyimide of claim 1 in the form of a fiber.
6. The polyimide of claim 1 in the form of a film.
7. A high molecular weight fiber and film forming polyimide acid consisting essentially of the structural unit

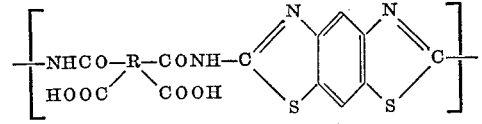

wherein R is a tetravalent aromatic radical selected from the group consisting of

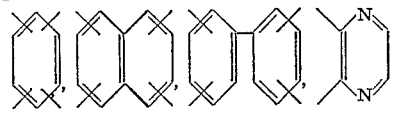

and

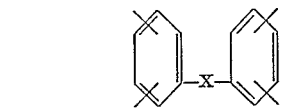

wherein $x$ is CO, O, S, SO$_2$ or CONH.

References Cited

UNITED STATES PATENTS 3,179,630   4/1965   Endrey _____ 260—78
3,342,774   9/1967   Hoegger _____ 260—47

WILLIAM H. SHORT, *Primary Examiner.*

L. L. LEE, *Assistant Examiner.*

U.S. Cl. X.R.

260—47, 78, 79, 79.3